US009678377B2

(12) United States Patent
Zhou

(10) Patent No.: US 9,678,377 B2
(45) Date of Patent: Jun. 13, 2017

(54) TOUCH STRUCTURE, LCD PANEL AND DISPLAY DEVICE

(71) Applicant: BOE TECHNOLOGY GROUP CO., LTD., Beijing (CN)

(72) Inventor: Xiaodong Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 14/409,337

(22) PCT Filed: Jun. 6, 2014

(86) PCT No.: PCT/CN2014/079367
§ 371 (c)(1),
(2) Date: Dec. 18, 2014

(87) PCT Pub. No.: WO2015/070596
PCT Pub. Date: May 21, 2015

(65) Prior Publication Data
US 2016/0274397 A1 Sep. 22, 2016

(30) Foreign Application Priority Data

Nov. 15, 2013 (CN) .......................... 2013 1 0573320

(51) Int. Cl.
*G02F 1/1333* (2006.01)
*G02F 1/1368* (2006.01)
(Continued)

(52) U.S. Cl.
CPC ........ *G02F 1/13338* (2013.01); *G02F 1/1368* (2013.01); *G02F 1/134309* (2013.01);
(Continued)

(58) Field of Classification Search
CPC ............... G02F 1/13338; G02F 1/1368; G02F 1/136286; G02F 1/134309;
(Continued)

(56) References Cited

U.S. PATENT DOCUMENTS

2008/0129898 A1* 6/2008 Moon .................. G02F 1/13338
349/12
2008/0180400 A1* 7/2008 Kim ........................ G06F 3/044
345/173

(Continued)

FOREIGN PATENT DOCUMENTS

CN 101231563 A 7/2008
CN 101539819 A 9/2009
(Continued)

OTHER PUBLICATIONS

Second Office Action regarding Chinese application No. 201310573320.1, dated Oct. 9, 2015. Translation provided by Dragon Intellectual Property Law Firm.
(Continued)

*Primary Examiner* — Nalini Mummalaneni
*Assistant Examiner* — Ivelisse Martinez Quiles
(74) *Attorney, Agent, or Firm* — Harness, Dickey & Pierce, P.L.C.

(57) ABSTRACT

Provided are touch structure, LCD panel and display device. The touch structure comprises a plurality of first signal lines; a plurality of second signal lines, a plurality of crossing points being formed by cross arrangement of the plurality of first signal lines and the plurality of second signal lines which are insulated from each other; a plurality of touch units, corresponding to the plurality of crossing points one to one, wherein when one touch unit of the plurality of touch units is touched, the first signal line and the second signal line which form a crossing point corresponding to the touch
(Continued)

unit generate electrical signals respectively; a controller, connected to the plurality of first signal lines and the plurality of second signal lines respectively, for calculating a contact position based on the electrical signal of the first signal line and the electrical signal of the second signal line respectively.

13 Claims, 2 Drawing Sheets

(51) Int. Cl.
    *G06F 3/041*     (2006.01)
    *G06F 3/047*     (2006.01)
    *G02F 1/1343*     (2006.01)
    *G06F 3/044*     (2006.01)
    *G02F 1/1362*     (2006.01)

(52) U.S. Cl.
    CPC ........ *G02F 1/136286* (2013.01); *G06F 3/044* (2013.01); *G06F 3/047* (2013.01); *G06F 3/0412* (2013.01); *G06F 3/0416* (2013.01); *G02F 2001/13685* (2013.01); *G02F 2001/133394* (2013.01)

(58) Field of Classification Search
    CPC .......... G02F 2001/13685; G02F 2001/133394; G06F 3/047; G06F 3/0416; G06F 3/0412; G06F 3/0414; G06F 3/045; G06F 3/044
    See application file for complete search history.

(56) References Cited

U.S. PATENT DOCUMENTS

| | | | | |
|---|---|---|---|---|
| 2009/0237365 | A1* | 9/2009 | Choi | G06F 3/0412 345/173 |
| 2009/0295747 | A1 | 12/2009 | Hsieh et al. | |
| 2010/0013785 | A1* | 1/2010 | Murai | G06F 3/047 345/173 |
| 2010/0134427 | A1* | 6/2010 | Tsai | G06F 3/0412 345/173 |
| 2011/0063239 | A1* | 3/2011 | Xie | G06F 3/045 345/173 |
| 2013/0176265 | A1* | 7/2013 | Zurek | G06F 1/3262 345/174 |
| 2013/0300952 | A1* | 11/2013 | Yeh | G02F 1/13338 349/12 |
| 2013/0335371 | A1* | 12/2013 | Bayramoglu | G06F 3/041 345/174 |
| 2014/0362000 | A1* | 12/2014 | Seo | G02F 1/13394 345/173 |
| 2014/0362304 | A1* | 12/2014 | Wang | G02F 1/13338 349/12 |
| 2016/0117035 | A1* | 4/2016 | Watazu | G06F 3/0414 345/173 |

FOREIGN PATENT DOCUMENTS

| | | | |
|---|---|---|---|
| CN | 102541335 A | * | 7/2012 |
| CN | 102609122 A | | 7/2012 |
| CN | 102650914 A | | 8/2012 |
| CN | 103154864 A | | 6/2013 |
| CN | 103558946 A | | 2/2014 |
| WO | WO-2013-106147 A1 | | 7/2013 |

OTHER PUBLICATIONS

Written Opinion of the International Searching Authority for international application No. PCT/CN2014/079367.

International Search Report and Written Opinion dated Jun. 6, 2014 regarding PCT/CN2014/079367.

Chinese Office Action dated Feb. 16, 2015 regarding Chinese Application No. 201310573320.1. Translation provided by Dragon Intellectual Property Law Firm.

Third Office Action regarding Chinese application No. 201310573320.1, dated Apr. 22, 2016. Translation provided by Dragon Intellectual Property Law Firm.

* cited by examiner

TOUCH STRUCTURE, LCD PANEL AND DISPLAY DEVICE

CROSS-REFERENCE TO RELATED APPLICATIONS

This application is the U.S. national phase of PCT Application No. PCT/CN2014/079367 filed on Jun. 6, 2014, which claims priority to Chinese Patent Application No. 201310573320.1 filed on Nov. 15, 2013, the disclosures of which are incorporated in their entirety by reference herein.

TECHNICAL FIELD

The present disclosure relates to the field of display technology, in particular to an in cell touch structure, a liquid crystal display (LCD) panel and a display device.

BACKGROUND

Among display devices, a touch screen is one of the important carriers for integrating an input terminal and an output terminal. By measuring a coordinate position of a tough point on a display screen, the touch screen determines an intention of a user and thus performs a related operation.

From an angle of technical principles, touch screens may be divided into five categories: vector pressure sensing touch screens, resistive touch screens, capacitive touch screens, infrared touch screens and surface acoustic wave touch screens.

SUMMARY

The present disclosure aims to provide a touch structure, an LCD panel and a display device, which have simple structures, are free from external interference and can implement accurate positioning.

In a first aspect of the present disclosure, there is provided a touch structure, including:

a plurality of first signal lines;

a plurality of second signal lines, a plurality of crossing points being formed by cross arrangement of the plurality of first signal lines and the plurality of second signal lines which are insulated from each other;

a plurality of touch units, corresponding to the plurality of crossing points one to one, wherein when one touch unit of the plurality of touch units is touched, the first signal line and the second signal line which form a crossing point corresponding to the touch unit generate an electrical signal of the first signal line and an electrical signal of the second signal line respectively;

a controller, connected to the plurality of first signal lines and the plurality of second signal lines respectively, for calculating a contact position based on the electrical signal of the first signal line and the electrical signal of the second signal line respectively.

In the touch structure of the present disclosure, the touch unit includes a piezoelectric material contact by which the first signal line and the second signal line are respectively connected to a power supply, the first signal line and the second signal line are electrically connected to the power supply respectively when the piezoelectric material contact is touched, so as to generate the electrical signal of the first signal line and the electrical signal of the second signal line respectively.

In the touch structure of the present disclosure, the first signal line and the second signal line are respectively connected to a gate line of an LCD panel by the piezoelectric material contact, the first signal line and the second signal line are electrically connected to the gate line of the LCD panel respectively when the piezoelectric material contact is touched, so as to generate the electrical signal of the first signal line and the electrical signal of the second signal line respectively.

In the touch structure of the present disclosure, the touch unit further includes a first thin film transistor and a second thin film transistor, the piezoelectric material contact is connected to a first gate electrode of the first thin film transistor and a second gate electrode of the second thin film transistor respectively, a source electrode of the first thin film transistor and a source electrode of the second thin film transistor are respectively connected to the gate line of the LCD panel, a drain electrode of the first thin film transistor is connected to the second signal line, a drain electrode of the second thin film transistor is connected to the first signal line.

In the touch structure of the present disclosure, the first signal line and the second signal line are respectively connected to a data line of a LCD panel by the piezoelectric material contact, the first signal line and the second signal line are respectively connected to the data line of the LCD panel when the piezoelectric material contact is touched, so as to generate the electrical signal of the first signal line and the electrical signal of the second signal line respectively.

In the touch structure of the present disclosure, the touch unit further includes a first thin film transistor and a second thin film transistor, the piezoelectric material contact is connected to a first gate electrode of the first thin film transistor and a second gate electrode of the second thin film transistor respectively, a source electrode of the first thin film transistor and a source electrode of the second thin film transistor are respectively connected to the data line of the LCD panel, a drain electrode of the first thin film transistor is connected to the second signal line, a drain electrode of the second thin film transistor is connected to the first signal line.

In a second aspect of the present disclosure, there is provided an LCD panel, including the touch structure of the present disclosure.

The LCD panel further includes a first substrate; a second substrate disposed oppositely to the first substrate; and a liquid crystal layer disposed between the first substrate and the second substrate, wherein the first substrate is provided with a plurality of pixels, each of the plurality of pixels is provided with a third thin film transistor, a gate electrode of the third thin film transistor is connected to a gate line of the LCD panel, a source electrode of the third thin film transistor is connected to a data line of the LCD panel.

In the LCD panel of the present disclosure, the third thin film transistor has a top gate structure.

In a third aspect of the present disclosure, there is provided a display device, including the LCD panel of the present disclosure.

The controller in the touch structure of the present disclosure calculates the contact position based on the electrical signal of the first signal line and the electrical signal of the second signal line respectively, by which the touch structure may determine intention of a user and perform a related operation. The touch structure of the present disclosure has a simple structure, is free from external interference and may accurately locate the contact position.

The LCD panel and the display device of the present disclosure may integrate a display screen and a touch screen, they have simple structures, are free from external interference and may accurately locate the contact position.

DETAILED DESCRIPTION

Embodiment 1

Figure 1:
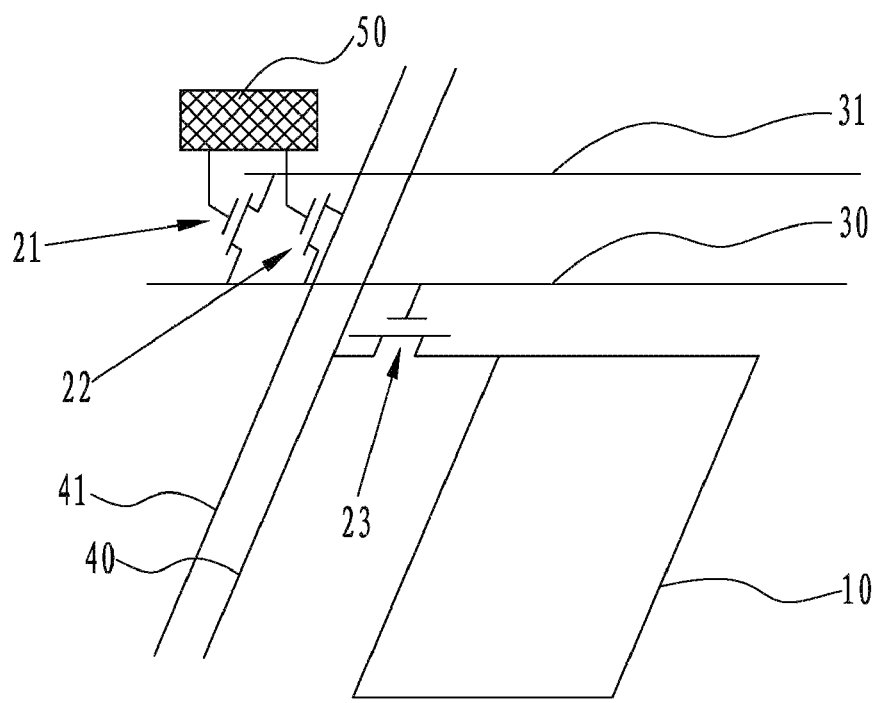
FIG. 1 is a schematic view showing a touch structure according to an embodiment of the present disclosure.

As shown in FIG. 1, the touch structure of the present embodiment includes:

a first signal line 41, and a second signal line 31 which is crosswise arranged with the first signal line 41, in which a plurality of crossing points are formed by cross arrangement of the first signal lines 41 and the second signal lines 31 which are insulated from each other. Specifically, the touch structure of the present disclosure includes a plurality of first signal lines 41 and a plurality of second signal lines 31, in which a plurality of crossing points (not shown in Figures) are formed by cross arrangement of the plurality of first signal lines 41 and the plurality of second signal lines 31.

A plurality of touch units correspond to the plurality of crossing points one to one, wherein when one touch unit of the plurality of touch units is touched, the first signal line and the second signal line which form a crossing point corresponding to the touch unit generate electrical signals respectively.

A controller, connected to the first signal line 41 and the second signal line 31 respectively, calculates a contact position based on the electrical signal of the first signal line 41 and the electrical signal of the second signal line 31 respectively.

In case that the touch structure includes a plurality of first signal lines 41 and a plurality of second signal lines 31, in a plane formed by the first signal lines 41 and the second signal lines 31, the plurality of first signal lines 41 may be used to represent coordinates in one direction of the plane and the plurality of second signal lines 31 may be used to represent coordinates in the other direction of the plane. When the controller receives an electrical signal of a certain first signal line and an electrical signal of a certain second signal line which is crosswise arranged with the first line, coordinates of such cross point in two directions of the plane may be obtained, while the plurality of touch units correspond to the plurality of cross points one to one, thus the controller may calculate the position coordinate of the touch unit corresponding to such cross point in the plane.

The controller in the touch structure of the present disclosure calculates the contact position based on the electrical signal of the first signal line and the electrical signal of the second signal line respectively, by which the touch structure may determine the intention of a user and perform a relative operation. The touch structure of the present disclosure has a simple structure, is free from interference and may accurately locate the contact position.

In the touch structure of the present embodiment, the touch unit includes a piezoelectric material contact 50, by which the first signal line 41 and the second signal line 31 are respectively connected to a power supply, when the piezoelectric material contact 50 is touched, the first signal line 41 and the second signal line 31 are respectively electrically connected with the power supply, to generate the electrical signal of the first signal line 41 and the electrical signal of the second signal line 31 respectively.

Specifically, in the touch structure of the present embodiment, the above-mentioned touch unit includes a piezoelectric material contact 50, by which the first signal line 41 and the second signal line 31 are respectively connected to a gate line 30 of a LCD panel, when the piezoelectric material contact 50 is touched, the first signal line 41 and the second signal line 31 are respectively electrically connected to the gate line 30 of the LCD panel, to generate the electrical signal of the first signal line 41 and the electrical signal of the second signal line 31 respectively, i.e., the gate line 30 of the LCD panel serves as a power supply providing power to the first signal line 41 and the second signal line 31.

In the touch structure of the present embodiment, the above-mentioned touch unit further includes a first thin film transistor 21 and a second thin film transistor 22, the piezoelectric material contact 50 is connected to a first gate electrode of the first thin film transistor 21 and a second gate electrode of the second thin film transistor 22 respectively, a source electrode of the first thin film transistor 21 and a source electrode of the second thin film transistor 22 are respectively connected to the gate line 30, a drain electrode of the first thin film transistor 21 is connected to the second signal line 31, a drain electrode of the second thin film transistor 22 is connected to the first signal line 41.

In the touch structure of the present embodiment, the first signal line 41 points to an X direction, the second signal line 31 is normal to the first signal line 41, pointing to a Y direction.

In case that the touch structure of the present embodiment is installed in an LCD panel and starts working, the gate line 30 of the LCD panel serves as a power supply providing power to the first signal line 41 and the second signal line 31. When a certain piezoelectric material contact 50 is touched, the piezoelectric material contact 50 generates a voltage, and turns on the first thin film transistor 21 and the second thin film transistor 22 respectively both of which are connected to the piezoelectric material contact 50, thus the gate line 30 of the LCD panel provides power to the first signal line 41 and the second signal line 31, the first signal line 41 and the second signal line 31 respectively generate electrical signals, a controller calculates a contact position based on the electrical signal of the first signal line 41 and the electrical signal of the second signal line 31 respectively, such position is the position of the cross point formed by cross arrangement of the first signal line 41 and the second signal line 31.

Embodiment 2

Figure 2:
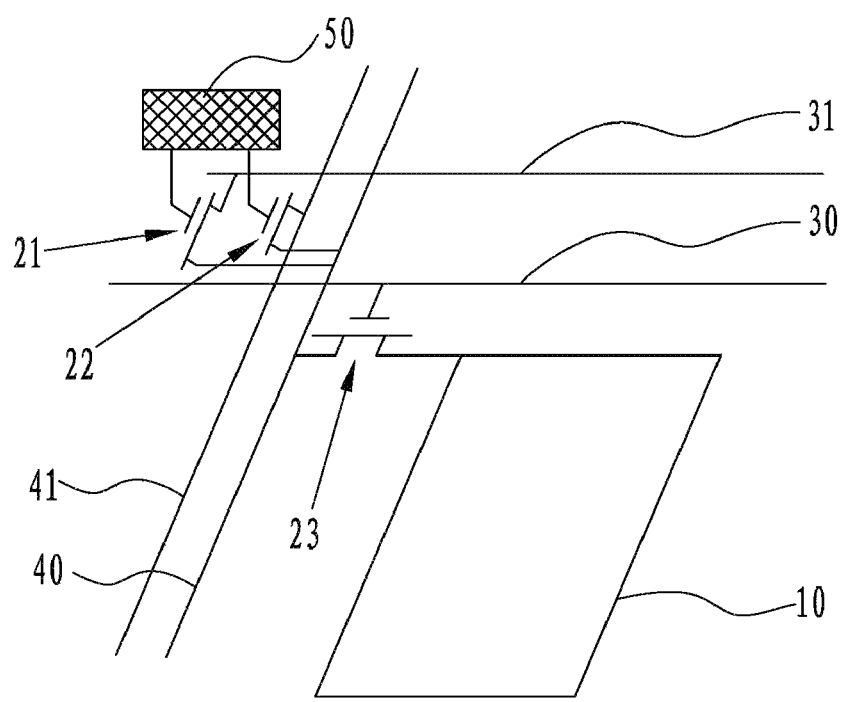
FIG. 2 is a schematic view showing a touch structure according to another embodiment of the present disclosure.

As shown in FIG. 2, a difference between the touch structure of the present embodiment and the touch structure of embodiment 1 lies in that the first thin film transistor 21 and the second thin film transistor 22 are connected in different ways, i.e., the power supply for providing power to the second signal line 31 and the first signal line 41 is a data line 40 of the LCD pane instead of the gate line 30 of the LCD panel.

In the touch structure of the present embodiment, the above-mentioned touch unit includes a piezoelectric material contact 50, by which the first signal line 41 and the second signal line 31 are respectively connected to the data line 40 of the LCD panel, when the piezoelectric material contact 50 is touched, the first signal line 41 and the second signal line 31 are respectively electrically connected to the data line 40 of the LCD panel, to generate the electrical signal of the first signal line 41 and the electrical signal of the second signal line 31 respectively, i.e., the data line 40 of the LCD panel serves as a power supply providing power to the first signal line 41 and the second signal line 31.

In the structure of the present embodiment, the above-mentioned touch unit further includes a first thin film transistor 21 and a second thin film transistor 22, the piezoelectric material contact 50 is connected to a first gate electrode of the first thin film transistor 21 and a second gate electrode of the second thin film transistor 22 respectively, a source electrode of the first thin film transistor 21 and a source electrode of the second thin film transistor 22 are respectively connected to the data line 40, a drain electrode of the first thin film transistor 21 is connected to the second signal line 31, a drain electrode of the second thin film transistor 22 is connected to the first signal line 41.

In the touch structure of the present embodiment, the second signal line 31 is parallel to the gate line 30, the first signal line 41 is parallel to the data line 40.

In other embodiments of the touch structure of the present disclosure, the first signal line may be parallel to the gate line, the second signal line may parallel to the data line.

The working process of the touch structure of the present embodiment is substantially same as that of embodiment 1, a difference therebetween only lies in that the data line 40 serves as a power supply providing power to the first signal line 41 and the second signal line 31.

In other embodiments of the touch structure of the present disclosure, one individual signal line may be further arranged, such individual signal line connects to a source electrode of the first thin film transistor 21 and a source electrode of the second thin film transistor 22 respectively, i.e., such individual signal line servers as a power supply providing power to the first signal line and the second signal line.

In the touch structure of the present embodiment, the piezoelectric material contact 50 may use piezoelectric polymer (polyvinylidene fluoride) material, piezoelectric crystal material or piezoelectric composite material.

The LCD panel according to embodiments of the present disclosure, includes a first substrate, a second substrate arranged oppositely to the first substrate, and a liquid crystal layer arranged between the first substrate and the second substrate, in which the first substrate is provided with a plurality of pixels, each of the plurality of pixels is provided with a third thin film transistor 23. A gate electrode of the third thin film transistor 23 is connected to a gate line of the LCD panel, a source electrode of the third thin film transistor 23 is connected to a data line of the LCD panel. The LCD panel according to the embodiments of the present disclosure may further include the touch structure of the present disclosure.

In the LCD panel according to embodiments of the present disclosure, the third thin film transistor has a top gate structure.

A display device of the present disclosure includes the LCD panel of the present disclosure.

The above-mentioned display device may be any products or components having display function such as a liquid crystal display (LCD) panel, an electronic paper, an organic light emitting display (OLED) panel, a liquid crystal display Television (LCD TV), a liquid crystal display, a digital photo frame, a mobile phone, a tablet personal computer.

The above are merely the preferred embodiments of the present disclosure. It should be noted that, a person skilled in the art may further make improvements and modifications without departing from the principle of the present disclosure, and these improvements and modifications shall also be considered as the scope of the present disclosure.

What is claimed is:

1. A touch structure of a liquid crystal display (LCD) panel, the touch structure comprising:
   a plurality of first signal lines;
   a plurality of second signal lines, a plurality of crossing points being formed by cross arrangement of the plurality of first signal lines and the plurality of second signal lines, the plurality of first signal lines and the plurality of second signal lines being insulated from each other;
   a plurality of touch units, corresponding to the plurality of crossing points one to one, wherein when one touch unit of the plurality of touch units is touched, a first signal line of the plurality of first signal lines and a second signal line of the plurality of second signal lines which form a crossing point corresponding to the touch unit generate an electrical signal of the first signal line and an electrical signal of the second signal line respectively; and
   a controller, connected to the plurality of first signal lines and the plurality of second signal lines respectively, for calculating a contact position based on the electrical signal of the first signal line and the electrical signal of the second signal line respectively,
   wherein the touch unit comprises a piezoelectric material contact, by which the first signal line and the second signal line are respectively connected to a power supply, the first signal line and the second signal line are electrically connected to the power supply respectively when the piezoelectric material contact is touched, so as to generate the electrical signal of the first signal line and the electrical signal of the second signal line respectively, and
   wherein the first signal line and the second signal line are respectively connected to a gate line of the LCD panel by the piezoelectric material contact, the first signal line and the second signal line are electrically connected to the gate line of the LCD panel respectively when the piezoelectric material contact is touched, so as to generate the electrical signal of the first signal line and the electrical signal of the second signal line respectively.

2. The touch structure according to claim 1, wherein: the touch unit further comprises a first thin film transistor and a second thin film transistor, the piezoelectric material contact is connected to a first gate electrode of the first thin film transistor and a second gate electrode of the second thin film transistor respectively, a source electrode of the first thin film transistor and a source electrode of the second thin film transistor are respectively connected to the gate line of the LCD panel, a drain electrode of the first thin film transistor is connected to the second signal line, and a drain electrode of the second thin film transistor is connected to the first signal line.

3. The LCD panel referred to in claim 1, comprising:
   the touch structure according to claim 1; and
   a liquid crystal layer.

4. The LCD panel according to claim 3, further comprising:
   a first substrate; and
   a second substrate arranged oppositely to the first substrate,
   wherein the liquid crystal layer is arranged between the first substrate and the second substrate,
   wherein the first substrate is provided with a plurality of pixels, each of the plurality of pixels is provided with a thin film transistor, a gate electrode of the thin film transistor is connected to a gate line of the LCD panel, and a source electrode of the thin film transistor is connected to a data line of the LCD panel.

5. The LCD panel according to claim 4, wherein the thin film transistor has a top gate structure.

6. A display device, comprising the LCD panel according to claim 3.

7. The display device according to claim 6, further comprising:
a first substrate; and
a second substrate arranged oppositely to the first substrate,
wherein the liquid crystal layer is arranged between the first substrate and the second substrate,
wherein the first substrate is provided with a plurality of pixels, each of the plurality of pixels is provided with a thin film transistor, a gate electrode of the thin film transistor is connected to a gate line of the LCD panel, and a source electrode of the thin film transistor is connected to a data line of the LCD panel.

8. The display device according to claim 7, wherein the thin film transistor has a top gate structure.

9. The LCD panel according to claim 3, wherein: the touch unit further comprises a first thin film transistor and a second thin film transistor, the piezoelectric material contact is connected to a first gate electrode of the first thin film transistor and a second gate electrode of the second thin film transistor respectively, a source electrode of the first thin film transistor and a source electrode of the second thin film transistor are respectively connected to the gate line of the LCD panel, a drain electrode of the first thin film transistor is connected to the second signal line, and a drain electrode of the second thin film transistor is connected to the first signal line.

10. A touch structure of a liquid crystal display (LCD) panel, the touch structure comprising:
a plurality of first signal lines;
a plurality of second signal lines, a plurality of crossing points being formed by cross arrangement of the plurality of first signal lines and the plurality of second signal lines, the plurality of first signal lines and the plurality of second signal lines being insulated from each other;
a plurality of touch units, corresponding to the plurality of crossing points one to one, wherein when one touch unit of the plurality of touch units is touched, a first signal line of the plurality of first signal lines and a second signal line of the plurality of second signal lines which form a crossing point corresponding to the touch unit generate an electrical signal of the first signal line and an electrical signal of the second signal line respectively; and a controller, connected to the plurality of first signal lines and the plurality of second signal lines respectively, for calculating a contact position based on the electrical signal of the first signal line and the electrical signal of the second signal line respectively,
wherein the touch unit comprises a piezoelectric material contact, by which the first signal line and the second signal line are respectively connected to a power supply, the first signal line and the second signal line are electrically connected to the power supply respectively when the piezoelectric material contact is touched, so as to generate the electrical signal of the first signal line and the electrical signal of the second signal line respectively, and
wherein the first signal line and the second signal line are respectively connected to a data line of the LCD panel by the piezoelectric material contact, the first signal line and the second signal line are respectively connected to the data line of the LCD panel when the piezoelectric material contact is touched, so as to generate the electrical signal of the first signal line and the electrical signal of the second signal line respectively.

11. The touch structure according to claim 10, wherein: the touch unit further comprises a first thin film transistor and a second thin film transistor, the piezoelectric material contact is connected to a first gate electrode of the first thin film transistor and a second gate electrode of the second thin film transistor respectively, a source electrode of the first thin film transistor and a source electrode of the second thin film transistor are respectively connected to the data line of the LCD panel, a drain electrode of the first thin film transistor is connected to the second signal line, and a drain electrode of the second thin film transistor is connected to the first signal line.

12. The LCD panel referred to in claim 10, comprising:
the touch structure according to claim 10; and
a liquid crystal layer.

13. The LCD panel according to claim 12, wherein: the touch unit further comprises a first thin film transistor and a second thin film transistor, the piezoelectric material contact is connected to a first gate electrode of the first thin film transistor and a second gate electrode of the second thin film transistor respectively, a source electrode of the first thin film transistor and a source electrode of the second thin film transistor are respectively connected to the data line of the LCD panel, a drain electrode of the first thin film transistor is connected to the second signal line, and a drain electrode of the second thin film transistor is connected to the first signal line.

* * * * *